US009966782B2

United States Patent
Cho et al.

(10) Patent No.: US 9,966,782 B2
(45) Date of Patent: May 8, 2018

(54) BATTERY PACK AND METHOD OF CONTROLLING CHARGING AND DISCHARGING OF THE BATTERY PACK

(71) Applicant: SAMSUNG ELECTRONICS CO., LTD., Suwon-si, Gyeonggi-do (KR)

(72) Inventors: Yong Hee Cho, Seoul (KR); Seong Woon Booh, Yongin-si (KR); Changhoon Jung, Seoul (KR); Eun Seog Cho, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 41 days.

(21) Appl. No.: 15/274,223

(22) Filed: Sep. 23, 2016

(65) Prior Publication Data

US 2017/0093179 A1 Mar. 30, 2017

(30) Foreign Application Priority Data

Sep. 24, 2015 (KR) .......................... 10-2015-0135884

(51) Int. Cl.
*H02J 7/00* (2006.01)
*H01M 4/00* (2006.01)
(Continued)

(52) U.S. Cl.
CPC ............. *H02J 7/007* (2013.01); *H01M 4/364* (2013.01); *H01M 4/386* (2013.01); *H01M 4/587* (2013.01);
(Continued)

(58) Field of Classification Search
CPC ........ H02J 7/007; H02J 7/0021; H01M 4/364; H01M 4/386; H01M 4/587;
(Continued)

(56) References Cited

U.S. PATENT DOCUMENTS 6,544,691 B1 * 4/2003 Guidotti ................. H01M 4/40
429/307
7,611,802 B2 11/2009 Kim et al.
(Continued)

FOREIGN PATENT DOCUMENTS

JP 2010-097756 A 4/2010
JP 2014-194864 A 10/2014
(Continued)

OTHER PUBLICATIONS

Koga, Japanese Patent Document No. JP 2015198052 A, published Nov. 9, 2015, abstract and 1 drawing, 7 pages.*
(Continued)

*Primary Examiner* — Phallaka Kik
(74) *Attorney, Agent, or Firm* — Cantor Colburn LLP (57) ABSTRACT

A battery assembly including: at least one rechargeable lithium battery including a negative electrode including a silicon-containing negative active material selected from silicon, a silicon-carbon composite, and a combination thereof, and a positive electrode including a positive active material; a circuit board electrically connected to the battery assembly; and an outer terminal electrically connecting the battery assembly to an outer power or an outer load, wherein the circuit board includes a charge/discharge element for charging and discharging the battery assembly and a charge/discharge controller electrically connected to the battery assembly and the charge/discharge element, wherein the charge/discharge controller controls the charge and discharge of the battery assembly, and wherein a discharge cut-off voltage of the charge/discharge controller is predetermined as a voltage when $Li_xSi$ present in the negative electrode during the discharge has an x value of less than or equal to about 1.25.

12 Claims, 4 Drawing Sheets

(51) Int. Cl.
| | |
|---|---|
| *H01M 10/00* | (2006.01) |
| *H01M 10/44* | (2006.01) |
| *H01M 10/0525* | (2010.01) |
| *H01M 10/46* | (2006.01) |
| *H01M 10/42* | (2006.01) |
| *H01M 4/38* | (2006.01) |
| *H01M 4/36* | (2006.01) |
| *H01M 4/587* | (2010.01) |
| *H01M 4/02* | (2006.01) |

(52) U.S. Cl.
CPC ..... *H01M 10/0525* (2013.01); *H01M 10/425* (2013.01); *H01M 10/441* (2013.01); *H01M 10/46* (2013.01); *H02J 7/0021* (2013.01); *H01M 2004/027* (2013.01)

(58) Field of Classification Search
CPC ........... H01M 10/0525; H01M 10/425; H01M 10/441; H01M 10/46; H01M 2004/027
USPC .................................................. 320/112, 128
See application file for complete search history.

(56) References Cited

U.S. PATENT DOCUMENTS

| | | | | |
|---|---|---|---|---|
| 2005/0214646 | A1* | 9/2005 | Kubota | H01M 4/134 429/231.95 |
| 2010/0099018 | A1 | 4/2010 | Kawase et al. | |
| 2010/0156351 | A1* | 6/2010 | Ugaji | G01R 31/3679 320/132 |
| 2010/0178569 | A1* | 7/2010 | Ihara | H01M 4/133 429/325 |
| 2010/0264929 | A1* | 10/2010 | Ugaji | G01R 31/3679 324/426 |
| 2012/0052388 | A1 | 3/2012 | Jung et al. | |
| 2012/0231339 | A1 | 9/2012 | Park et al. | |
| 2012/0264015 | A1 | 10/2012 | Jung et al. | |
| 2012/0316716 | A1* | 12/2012 | Odani | H01M 10/0567 701/22 |
| 2013/0059203 | A1 | 3/2013 | Hong et al. | |
| 2013/0314051 | A1* | 11/2013 | Takezawa | H01M 10/0525 320/134 |
| 2014/0087268 | A1 | 3/2014 | Kim et al. | |
| 2014/0120416 | A1 | 5/2014 | Paik et al. | |
| 2014/0154578 | A1 | 6/2014 | Yoo et al. | |
| 2014/0178754 | A1 | 6/2014 | Kim et al. | |
| 2014/0377643 | A1 | 12/2014 | Lee et al. | |
| 2015/0072240 | A1 | 3/2015 | Yoo et al. | |
| 2015/0140435 | A1* | 5/2015 | Lee | H01M 4/48 429/231.4 |
| 2016/0111228 | A1* | 4/2016 | Okuno | H01G 11/06 320/167 |
| 2016/0254687 | A1* | 9/2016 | Tanaka | H02J 7/045 320/112 |
| 2016/0308258 | A1* | 10/2016 | Ogihara | H01M 4/505 |
| 2016/0336592 | A1* | 11/2016 | Hirose | H01M 4/525 |

FOREIGN PATENT DOCUMENTS

| | | |
|---|---|---|
| KR | 2007-0120734 A | 12/2007 |
| KR | 2011-0124728 A | 11/2011 |
| KR | 2012-0101971 A | 9/2012 |
| KR | 2013-0033251 A | 4/2013 |
| KR | 2014-0053648 A | 5/2014 |

OTHER PUBLICATIONS

Hung T. Nguyen et al. "Highly Interconnected Si Nanowires for Improved Stability Li-Ion Battery Anodes", Advanced Energy Materials, 2011, 1, 1154-1161.

M. N. Obrovac et al. "Alloy Negative Electrodes for Li-Ion Batteries", Chemical Reviews, 2014, 114, 11444-11502.

M. N. Obrovac et al. "Structural Changes in Silicon Anodes during Lithium Insertion/Extraction", Electrochemical and Solid-State Letters, 7 (5) A93-A96 (2004).

Matthew T. McDowell et al. "25th Anniversary Article: Understanding the Lithiation of Silicon and Other Alloying Anodes for Lithium-Ion Batteries", Advanced Materials, 2013, 25, 4966-4985.

Moni Kanchan Datta et al. "In situ electrochemical synthesis of lithiated silicon-carbon based composites anode materials for lithium ion batteries", Journal of Power Sources, 194 (2009) 1043-1052.

N. Ding et al. "Determination of the diffusion coefficient of lithium ions in nano-Si", Solid State Ionics, 180 (2009) 222-225.

Seok Woo Lee et al. "Fracture of crystalline silicon nanopillars during electrochemical lithium insertion", PNAS 2012, vol. 109, No. 11, 4080-4085.

Zijing Ding et al. "Towards understanding the effects of carbon and nitrogen-doped carbon coating on the electrochemical performance of $Li_4Ti_5O_{12}$ in lithium ion batteries: a combined experimental and theoretical study", Phys. Chem. Chem. Phys., 2011, 13, 15127-15133.

* cited by examiner

BATTERY PACK AND METHOD OF CONTROLLING CHARGING AND DISCHARGING OF THE BATTERY PACK

CROSS-REFERENCE TO RELATED APPLICATION

This application claims priority to Korean Patent Application No. 10-2015-0135884, filed on Sep. 24, 2015, and all the benefits accruing therefrom under 35 U.S.C. § 119, the content of which is incorporated herein in its entirety by reference.

BACKGROUND

1. Field

A battery pack and a method of controlling charging and discharging of the battery pack capable of improving capacity and cycle life of a rechargeable lithium battery are provided.

2. Description of the Related Art

Batteries generate electrical power using an electrochemical reaction material for a positive electrode and a negative electrode. Rechargeable lithium batteries generate electrical energy due to chemical potential changes during intercalation/deintercalation of lithium ions at the positive and negative electrodes.

The rechargeable lithium batteries include a material reversibly intercalating or deintercalating lithium ions during charge and discharge reactions as both positive and negative active materials, and are filled with an organic electrolyte or a polymer electrolyte between the positive and negative electrodes.

As the positive active material for a rechargeable lithium battery, metal oxide composites such as $LiCoO_2$, $LiMn_2O_4$, $LiNiO_2$, $LiNi_{1-x}Co_xO_2$ (wherein 0<x<1), and $LiMnO_2$ have been a focus of extensive research.

As for negative active materials of a rechargeable lithium battery, various carbon-containing materials capable of intercalating lithium ions (such as artificial graphite, natural graphite, and hard carbon) may be used. Since among the carbon-containing materials, graphite has a low discharge voltage of −0.2 Volts (V) relative to lithium, a battery including graphite as a negative active material has a high discharge voltage of 3.6 V to provide high energy density of a lithium battery, and also has improved reversibility to ensure a long life-cycle of a rechargeable lithium battery, and therefore, may be widely used. However, the graphite active material has low capacity in a view of energy density per unit weight of an electrode plate when the electrode plate is fabricated.

Recently, the high-capacity negative active material has been widely investigated to find a substitute for the graphite active material. One of these materials includes a silicon-containing active material such as silicon, a silicon-containing alloy, and the like. The silicon-containing active material has very high capacity compared to the carbon material but generates cracks due to a huge volume change when reacting with lithium during charge/discharge, breaking a silicon active material particle, such that the capacity is rapidly deteriorated leading to degradation of the cycle life according to repeating charge/discharge cycles.

Thus, there remains a need in a material which is capable of maintaining a desirable cycle life characteristics of the battery pack.

SUMMARY

An embodiment provides a battery pack using a silicon-containing active material and that ensures desirable cycle life characteristics.

Another embodiment provides a method of controlling charging and discharging of the battery pack.

According to an embodiment, a battery pack includes:
a battery assembly including at least one rechargeable lithium battery including:
 a negative electrode including a silicon-containing negative active material selected from silicon, a silicon-carbon composite, and a combination thereof, and
 a positive electrode including a positive active material;
a circuit board electrically connected to the battery assembly; and
an outer terminal electrically connecting the battery assembly to external power or an external load,
 wherein the circuit board includes:
 a charge/discharge element for charging and discharging the battery assembly and
 a charge/discharge controller electrically connected to the battery assembly and the charge/discharge element, wherein the charge/discharge controller controls the charge and discharge of the battery assembly, and
 wherein a discharge cut-off voltage of the charge/discharge controller is predetermined as a voltage when $Li_xSi$ present in the negative electrode during discharge has an x value of less than or equal to about 1.25.

The x value of $Li_xSi$ may be determined by Equation 1.

$$x = A_1 - A_2/e^{kD} \qquad \text{Equation 1}$$

In Equation 1,
x is a stoichiometric value of lithium in $Li_xSi$,
$A_1$ is a constant ranging from about 1.14 to about 1.35,
$A_2$ is a constant ranging from about 11.93 to about 12.13,
k is a constant ranging from about 1.88 to about 2.08, and
D is an effective average particle diameter of the silicon-containing negative active material during discharge.

In Equation 1,
$A_1$ may be a constant ranging from about 1.19 to 1.29,
$A_2$ may be a constant ranging from about 11.98 to about 12.08, and
k may be a constant ranging from about 1.93 to about 2.03.

In Equation 1, the effective average particle diameter D may range from about 1 micrometer to about 5 micrometers.

The discharge cut-off voltage may be determined by a voltage when the discharge capacity determined by Equation 2 is obtained.

$$\frac{x_0 - x}{x_0} \cdot C_{init} \qquad \text{Equation 2}$$

In Equation 2,
$x_0$ is a stoichiometric maximum value of lithium present in $Li_xSi$ during charge;
x is an x value of $Li_xSi$ at the discharge cut-off; and
$C_{init}$ is a discharge capacity during a first discharge.

The circuit board may further include a switching element electrically connected to the charge/discharge controller, wherein the switching element controls the electrical connection between the battery assembly and the outer terminal.

The circuit board may further include a current measuring element electrically connected to the charge/discharge controller.

According to another embodiment, a method of controlling charging and discharging of a battery pack includes:

charging a battery assembly including at least one rechargeable lithium battery including a negative electrode including a silicon-containing negative active material selected from silicon, a silicon-carbon composite, and a combination thereof, and a positive electrode including a positive active material; and discharging the battery assembly until a voltage of the battery assembly reaches a predetermined discharge cut-off voltage of a charge/discharge controller, wherein the discharge cut-off voltage is predetermined as a voltage when $Li_xSi$ present in the negative electrode has an x value of less than or equal to about 1.25.

The x value of $Li_xSi$ may be determined by Equation 1.

$$x = A_1 - A_2/e^{kD} \quad \text{Equation 1}$$

In Equation 1, x is a stoichiometric value of lithium in $Li_xSi$, $A_1$ is a constant ranging from about 1.14 to about 1.35, $A_2$ is a constant ranging from about 11.93 to about 12.13, k is a constant ranging from about 1.88 to about 2.08, and D is an effective average particle diameter during discharging of the silicon-containing negative active material.

In Equation 1, $A_1$ may be a constant ranging from about 1.19 to about 1.29, $A_2$ may be a constant ranging from about 11.98 to about 12.08, and k may be a constant ranging from about 1.93 to about 2.03.

In Equation 1, the effective average particle diameter may range from about 1 micrometer to about 5 micrometers.

The discharge cut-off voltage may be predetermined as a voltage when the discharge capacity determined by Equation 2 is obtained.

$$\frac{x_0 - x}{x_0} \cdot C_{init} \quad \text{Equation 2}$$

In Equation 2, $x_0$ is a stoichiometric maximum value of lithium present in $Li_xSi$ during charge;

x is an x value of $Li_xSi$ at the discharge cut-off; and $C_{init}$ is a discharge capacity during the first discharge.

BRIEF DESCRIPTION OF THE DRAWINGS

The above and other advantages and features of this disclosure will become more apparent by describing exemplary embodiments thereof in further detail with reference to the accompanying drawings, in which.

DETAILED DESCRIPTION

Exemplary embodiments of the present disclosure will hereinafter be described in detail with reference to the accompanying drawings, and may be easily performed by those who have common knowledge in the related art. However, this disclosure may be embodied in many different forms and is not construed as limited to the exemplary embodiments set forth herein.

A part having no relationship with the description is omitted for clarity, and the same or similar constituent elements are indicated by the same reference numerals throughout the specification.

Exemplary embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Further, the singular includes the plural unless mentioned otherwise.

In the drawings, the thickness of layers, films, panels, regions, etc., are exaggerated for clarity. Like reference numerals designate like elements throughout the specification.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. Unless specified otherwise, the term "or" means "and/or." As used herein, the term "and/or" includes any and all combinations of one or more of the associated items. Expressions such as "at least one of," when preceding a list of elements, modify the entire list of elements and do not modify the individual elements of the list.

As used herein, the term "combination thereof" refers to a mixture, a stacked structure, a composite, an alloy, a blend, a reaction product, or the like.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

According to an embodiment, a battery pack includes:

a battery assembly including at least one rechargeable lithium battery including:

a negative electrode including a silicon-containing negative active material selected from silicon (Si), a silicon-carbon composite, and a combination thereof, and a positive electrode including a positive active material;

a circuit board electrically connected to the battery assembly; and an outer terminal electrically connecting the battery assembly to external power or an external load.

The circuit board includes a charge/discharge element for charging and discharging the battery assembly, and a charge/discharge controller electrically connected to the battery assembly and the charge/discharge element, wherein the charge/discharge controller controls charging and discharging of the battery assembly.

A discharge cut-off voltage of the charge/discharge controller is predetermined as a voltage when lithium silicide ($Li_xSi$) present in the negative electrode during discharge has an x value of less than or equal to about 1.25.

By controlling the discharge cut-off voltage of the battery assembly within a predetermined range, cracks in a silicon-containing negative active material may be prevented, and the cycle life characteristics may be improved.

In the rechargeable lithium battery for the battery assembly, the lithium ions present in the positive active material are transferred to the negative electrode during the charge, and the lithium ions present in the negative active material are transferred to the positive electrode again during the discharge. As the silicon-containing negative active material may include more lithium compared to the conventional carbon-containing material, it may have higher capacity.

Crystalline silicon having a diamond structure is converted to an amorphous $Li_xSi$ (a-$Li_xSi$) phase from the surface thereof by intercalating the lithium ions into the silicon-containing negative active material. Accordingly, the silicon-containing negative active material has a two-phase state in which the core portion is crystalline silicon and the shell portion is amorphous a-$Li_xSi$. In addition, by intercalating lithium, the volume of the shell portion including the a-$Li_xSi$ phase is expanded to develop cracks. The crack generation may be prevented by controlling a particle size of a silicon-containing negative active material having a spherical shape to greater than or equal to about 100 nanometers (nm) and less than or equal to about 150 nm. However, the cost of decreasing the particle size is high, and a void between particles capable of expansion by volume of the silicon-containing negative active material is decreased, and the lithium ion or electron mobility may be decreased since the SEI (solid electrolyte inter-phase) layer formed on the surface of the silicon-containing negative active material is also formed in a relatively high ratio.

Furthermore, the cracks on the surface of the silicon-containing negative active material may be generated by deintercalating lithium ions during the discharge. Lithium is deintercalated from the surface during the discharge, and lithium is diffused from the core portion to the shell portion. Due to the different lithium concentration between the core portion and the shell portion, a tensile strain is applied to the shell portion. Due to the strain, cracks are generated in the silicon-containing negative active material. The crack generation may decrease the capacity of the silicon-containing negative active material during repeating charge/discharge cycles, and may deteriorate the cycle life characteristics of the battery assembly.

Thus, provided is a battery pack in which the discharge cut-off voltage of the battery assembly is predetermined so that the lithium concentration in the silicon-containing negative active material is controlled within a range to avoid crack generation during the discharge.

Figure 1:
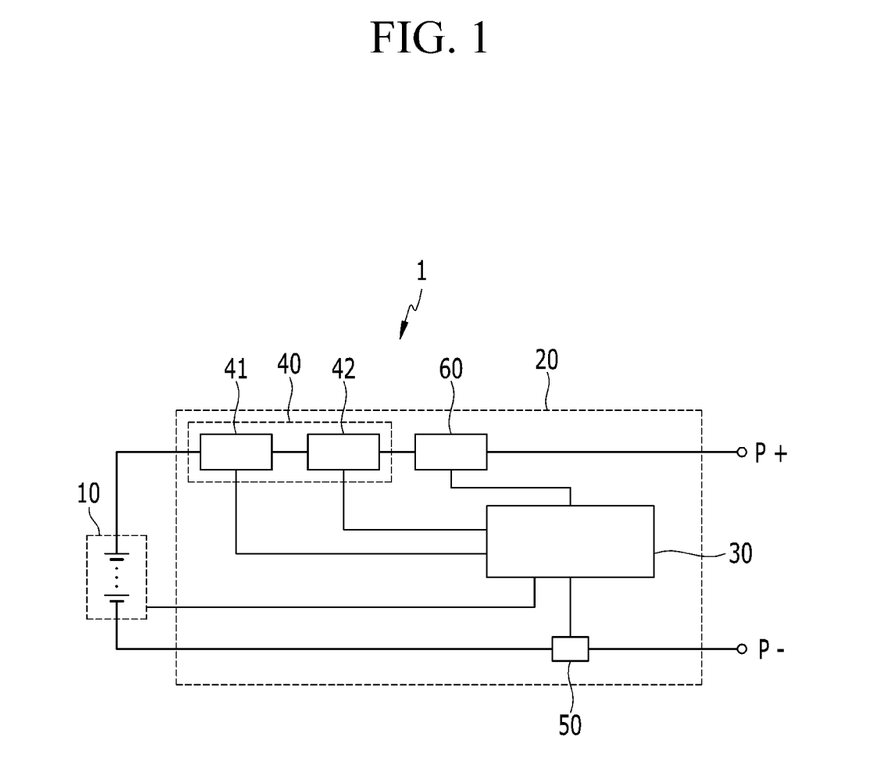
FIG. 1 is a block diagram schematically showing a battery pack according to an embodiment.

A structure of the battery pack is described with reference to FIG. 1. FIG. 1 is a block diagram schematically showing a battery pack according to an embodiment.

Referring to FIG. 1, the battery pack 1 includes a battery assembly 10, a circuit board 20, and outer terminals (P+, P−). The battery assembly 10 includes at least one rechargeable lithium battery that can be repeatedly charged and discharged, and is electrically connected to the circuit board 20 and the outer terminals.

The rechargeable lithium battery includes a negative electrode including a silicon-containing negative active material and a positive electrode including a positive active material. The silicon-containing negative active material may be selected from silicon (Si), a silicon-carbon composite, and a combination thereof.

The positive active material may include a compound (lithiated intercalation compound), which is capable of intercalating and deintercalating lithium ions. In an embodiment, at least one composite oxide of lithium and a metal of cobalt, manganese, nickel, or a combination thereof may be used.

A rechargeable lithium battery may be classified into a lithium ion battery, a lithium ion polymer battery, and a lithium polymer battery depending on the nature of a separator and an electrolyte. It may also be classified as a cylindrical battery, a prismatic battery, a coin-type battery, a pouch-type battery, and the like with regard to its shape. In addition, it may be a bulk type battery or a thin film type battery depending on the size. Structures and manufacturing methods for lithium ion batteries pertaining to this disclosure are well known in the art.

The outer terminal includes a positive terminal (P+) and a negative terminal (P−) and its function is to connect the battery assembly 10 to external power and an external load during charging and discharging of the battery assembly 10. Generally, when the outer terminal is connected to the external power, the battery assembly 10 is charged; and when the outer terminal is connected to the external load, the battery assembly 10 is discharged.

The circuit board 20 includes a charge/discharge controller 30, a charge/discharge element 40, a voltage measuring element 50, and a switching element 60, and its function is to recognize the voltage when lithium silicide ($Li_xSi$) in the negative electrode has an x value of less than or equal to about 1.25 and to stop the discharge of the battery assembly 10.

The charge/discharge element 40 of circuit board 20 is connected to the battery assembly 10, and includes a charge FET (field effect transistor) 41 and a discharge FET 42. When the charge FET 41 is operated, the battery is charged, and when the discharge FET 42 is operated, the battery is discharged. The charge/discharge element 40 is also connected to the charge/discharge controller 30, and the charge FET 41 or the discharge FET 42 is operated by controlling the charge/discharge controller 30, so the battery assembly 10 is charged or discharged.

The voltage measuring element 50 of the circuit board 20 includes a resistance sensor, and is connected to the battery assembly 10 to sense a voltage flowing in the battery assembly 10. Through the voltage measuring element 50, when sensing a voltage of greater than or equal to the predetermined reference value in the battery assembly 10, the voltage measuring element 50 sends a stop signal to the charge/discharge controller 30 so that the battery assembly 10 is blocked from being discharged, and the stop signal is sent to the switching element 60 through the charge/discharge controller 30. The predetermined voltage reference value, which is a discharge cut-off voltage, is predetermined as a voltage when lithium silicide ($Li_xSi$) present in the negative electrode has an x value of less than or equal to about 1.25.

The switching element 60 of the circuit board 20 is a device for controlling on/off switching of an electrical connection between the battery assembly 10 and the outer terminal. When the charge and discharge stop signal is delivered through the charge/discharge controller 30, the switching element 60 is turned off, and thus, the connection between the battery assembly 10 and the external power or the external load is blocked, so as to stop the charge and discharge of the battery assembly 10.

The circuit board may further include a current measuring element electrically connected to the charge/discharge controller. In this case, the current measuring element senses the current of the battery assembly during charging or discharging of the battery assembly, so that the discharge stop signal of the battery assembly may be delivered to the switching element through the charge/discharge controller.

By predetermining the discharge cut-off voltage of the battery pack 1 as a voltage when the lithium silicide ($Li_xSi$) in the negative electrode formed during charging the rechargeable lithium battery has an x value of less than or equal to about 1.25, the discharge may be controlled to improve the cycle life characteristics of the battery. The controlling of the discharge cut-off voltage controls the cut-off voltage at the discharge ending stage before starting the charge of the next cycle.

The x value of the lithium silicide ($Li_xSi$) may be determined by Equation 1.

$$x = A_1 - A_2/e^{kD}$$ Equation 1

In Equation 1, x is a stoichiometric value of lithium in lithium silicide ($Li_xSi$), $A_1$ is a constant ranging from about 1.14 to about 1.35, $A_2$ is a constant ranging from about 11.93 to about 12.13, k is a constant ranging from about 1.88 to about 2.08, and D is an effective average particle diameter of the silicon-containing negative active material during the discharge.

In Equation 1, $A_1$ may be a constant ranging from about 1.19 to about 1.29, $A_2$ may be a constant ranging from about 11.98 to about 12.08, and k may be a constant ranging from about 1.93 to about 2.03.

In Equation 1, the effective average particle diameter (D) may range from about 1 micrometer (μm) to about 5 μm. While not wishing to be bound by theory, it is understood that when the silicon-containing negative active material has the effective average particle diameter within the range, sufficient space may be ensured between the particles to expand the volume of the silicon-containing negative active material during the discharge.

The discharge cut-off voltage may be determined as a voltage when the discharge capacity determined by Equation 2 is obtained.

$$\frac{x_0 - x}{x_0} \cdot C_{init}$$ Equation 2

In Equation 2, $x_0$ is a stoichiometric value maximum value of lithium in lithium silicide ($Li_xSi$), x is an x value of lithium silicide ($Li_xSi$) at the discharge cut-off; and $C_{init}$ is a discharge capacity during the first discharge.

The $x_0$ may be about 3.75, which is an x value of the fully lithiated lithium silicide.

The calculation process of Equation 1 is illustrated with reference to FIG. 2.

Figure 2:
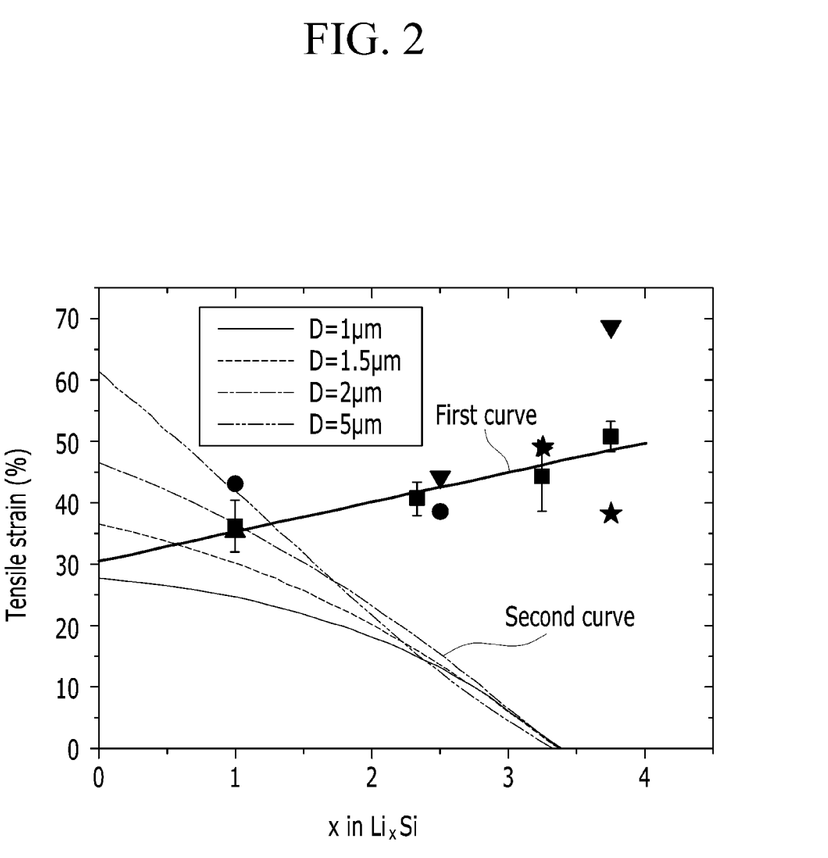
FIG. 2 is a graph of tensile strain (percent, %) versus x value of lithium silicide ($Li_xSi$) at the discharge cut-off calculated by Equation 1.

As shown in FIG. 2, a tensile strain, when the cracks in lithium silicide ($Li_xSi$) are generated, is calculated by DFT (density functional theory) and compensated to provide a first curve. Then, a strain applied to the surface of a silicon-containing negative active material having a spherical shape during the discharge is calculated by macroscopic mechanical modeling based on continuous simulation (using the Abacus simulation program) according to each effective average particle diameter of the silicon-containing negative active material to provide a second curve. Then, the x value at a position where the first curve and the second curve are crossed is determined and plotted as a function of the x value and the effective average particle diameter of the silicon-containing negative active material during the discharge to provide Relationship Equation 1. FIG. 2 shows macroscopic mechanical modeling results based on the continuous simulation when the silicon-containing negative active material has an effective average particle diameter of, for example, about 1 μm, about 1.5 μm, for example, about 2 μm, and for example, about 5 μm.

The tensile strain generating cracks of lithium silicide ($Li_xSi$) obtained by DFT (density functional theory) is compensated by Equation 1-1.

$$\epsilon = a(x-c) + b$$ Equation 1-1

In Equation 1-1,

ϵ is a tensile strain value when cracks are generated in the silicon-containing negative active material;

a is a constant of about 0.73 to about 0.94, for example, about 0.78 to about 0.89;

x is an x value of lithium silicide ($Li_xSi$), c is a constant of about 0.62 to about 0.83, for example, about 0.68 to about 0.76; and b is a constant of about 33.94 to about 34.14, for example, about 33.99 to about 34.09.

Hereinafter, the embodiments are illustrated in more detail with reference to examples. These examples, however, are not in any sense to be interpreted as limiting the scope of this disclosure.

EXAMPLES

Fabrication of Test Cell

Si powder (particle diameter: 4 μm), Super P carbon black, and a mixed binder of styrene-butadiene rubber (SBR) and carboxylmethyl cellulose (CMC) (mixing ratio=1:1 (weight ratio)) are mixed at a weight ratio of 80:10:10 in N-methylpyrrolidone solvent to provide a negative active material slurry. The obtained negative active material slurry is coated on a copper foil to a thickness of 15 µm and dried at 150° C. for 2 hours, and subsequently roll-pressed to provide a negative electrode.

Using the negative electrode, a lithium counter electrode, a micropore polyethylene separator, and an electrolyte, a coin-type half cell (CR2032 half cell) is fabricated in a helium-charged glove box. The electrolyte is prepared by dissolving 1 molar (M) LiPF$_6$ in a mixed solvent in which ethylene carbonate, dimethyl carbonate, and fluoroethylene carbonate are mixed in a volume ratio of 20:60:20.

Experimental Example 1: Cycle Life Characteristic

Figure 3:
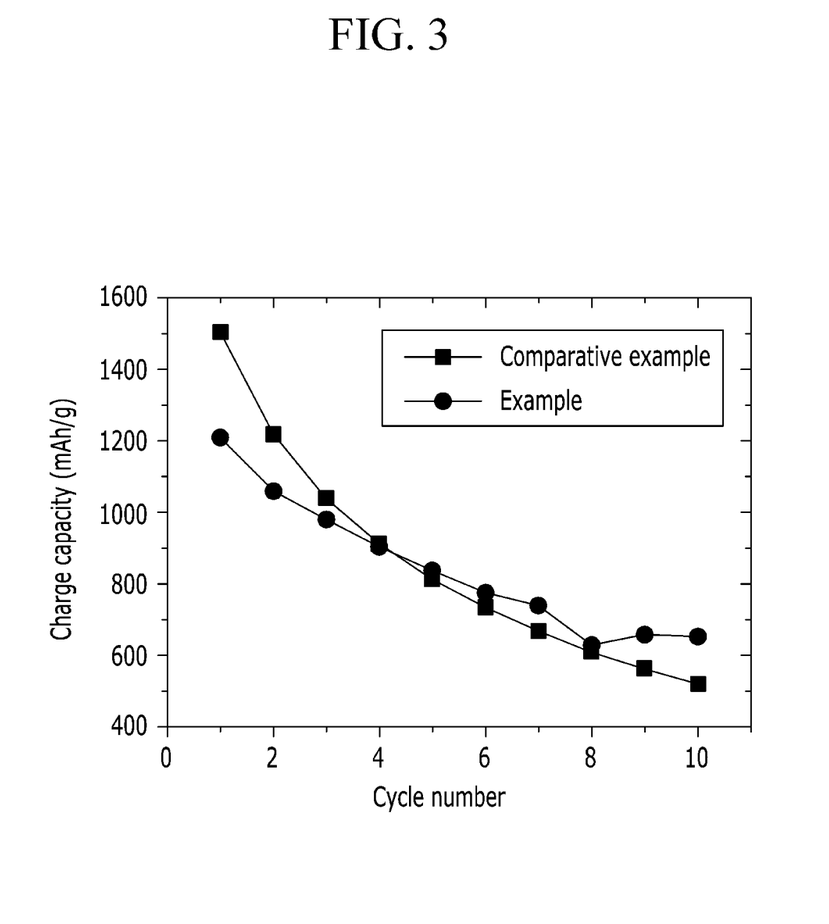
FIG. 3 is a graph of charge capacity versus cycle number (milliAmpere hours per gram, mAh/g) showing a discharge capacity obtained from the results of charging/discharging test cells according to an example and a comparative example.
Figure 4:
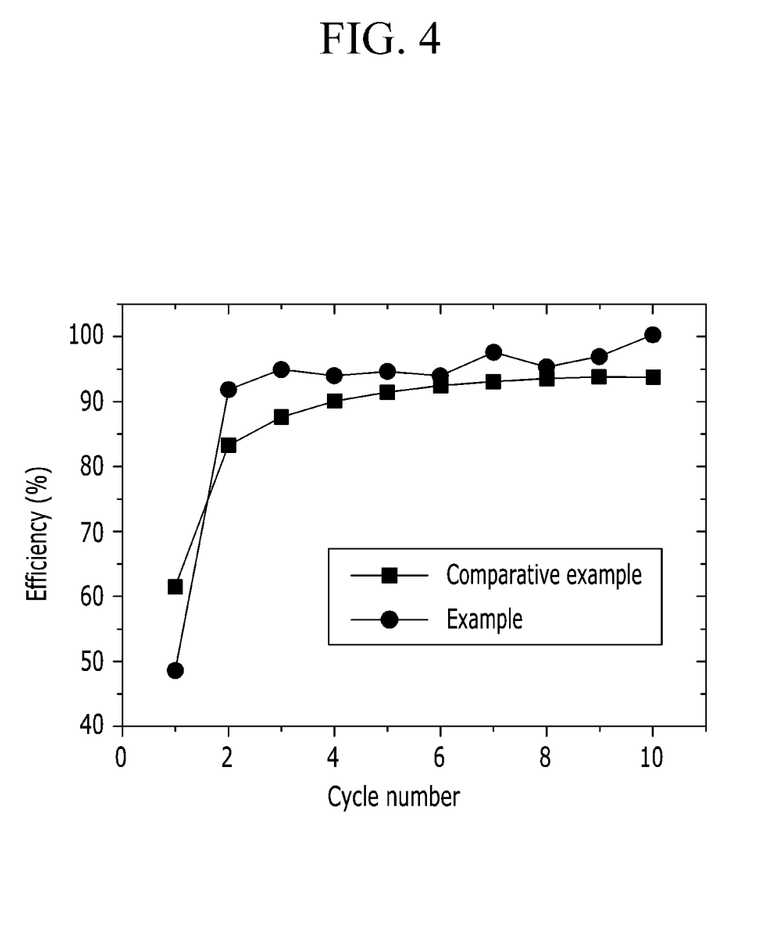
FIG. 4 is a graph of efficiency (percent, %) versus cycle number showing coulombic efficiency obtained from the results of charging/discharging test cells according to an example and a comparative example.

After discharging the obtained test cell under a constant current of 0.2 Coulombs (C) (lithiation process), it is charged (delithiation process) by predetermining the charge cut-off voltage at 1.5 Volts (V) (comparative example) and 0.5 V (example). Then the charge capacity and the coulombic efficiency (charge/discharge efficiency) are measured, and the results are shown in FIG. 3 and FIG. 4, respectively. The charge cut-off voltage is a cut-off voltage in the delithiation process, and corresponds to a discharge cut-off voltage in the case of a full cell instead of a half cell. The cut-off charge voltage of 0.5 V is a voltage corresponding to a capacity obtained by obtaining an x value of 1.25 according to Equation 1 and substituting the same in Equation 2.

$$\frac{x_0 - x}{x_0} \cdot C_{init} \qquad \text{Equation 2}$$

In Equation 2,
$x_0$ is 3.75,
x is 1.25, and
$C_{init}$ is 1,500 milliAmpere hours per gram (mAh/g).

FIG. 3 is a graph showing a charge capacity obtained from the results of charging/discharging test cells according to the example and comparative example, and FIG. 4 is a graph showing coulombic efficiency obtained from the results of charging/discharging test cells according to the example and comparative example.

Referring to FIG. 3 and FIG. 4, it is understood that the charged/discharged test cell according to the example has a capacity enhanced by 25.75% and efficiency enhanced in by 6.2% after 10 cycles compared to the charged/discharged test cell according to the comparative example. Thereby, it is determined that the charged/discharged test cell according to the example has decreased irreversible capacity and an improved cycle life characteristic compared to the charged/discharged test cell according to the comparative example.

While this disclosure has been described in connection with what is presently considered to be practical exemplary embodiments, it is to be understood that the disclosure is not limited to the present embodiments, but, on the contrary, is intended to cover various modifications and equivalent arrangements included within the spirit and scope of the appended claims.

What is claimed is:

1. A battery pack comprising:
    a battery assembly comprising at least one rechargeable lithium battery comprising:
        a negative electrode comprising a silicon-containing negative active material selected from silicon, a silicon-carbon composite, and a combination thereof, and
        a positive electrode comprising a positive active material;
    a circuit board electrically connected to the battery assembly; and
    an outer terminal electrically connecting the battery assembly to external power or an external load,
    wherein the circuit board comprises:
        a charge/discharge element for charging and discharging the battery assembly and
        a charge/discharge controller electrically connected to the battery assembly and the charge/discharge element, wherein the charge/discharge controller controls the charge and discharge of the battery assembly, and
    wherein a discharge cut-off voltage of the charge/discharge controller is predetermined as a voltage when Li$_x$Si present in the negative electrode during the discharge has an x value of less than or equal to about 1.25.

2. The battery pack of claim 1, wherein the x value of Li$_x$Si is determined by Equation 1:

$$x = A_1 - A_2/e^{kD} \qquad \text{Equation 1}$$

wherein in Equation 1,
x is a stoichiometric value of lithium in Li$_x$Si,
$A_1$ is a constant ranging from about 1.14 to about 1.35,
$A_2$ is a constant ranging from about 11.93 to about 12.13,
k is a constant ranging from about 1.88 to about 2.08, and
D is an effective average particle diameter of the silicon-containing negative active material during the discharge.

3. The battery pack of claim 2, wherein in Equation 1,
$A_1$ is a constant ranging from about 1.19 to about 1.29,
$A_2$ is a constant ranging from about 11.98 to about 12.08, and
k is a constant ranging from about 1.93 to about 2.03.

4. The battery pack of claim 2, wherein in Equation 1, the effective average particle diameter D ranges from about 1 micrometer to about 5 micrometers.

5. The battery pack of claim 2, wherein the discharge cut-off voltage is determined as a voltage when the discharge capacity determined by Equation 2 is obtained:

$$\frac{x_0 - x}{x_0} \cdot C_{init} \qquad \text{Equation 2}$$

wherein in Equation 2,
$x_0$ is a stoichiometric maximum value of lithium present in Li$_x$Si during the charge,
x is an x value of Li$_x$Si at the discharge cut-off, and
$C_{init}$ is a discharge capacity during a first discharge.

6. The battery pack of claim 1, wherein the circuit board further comprises a switching element electrically connected to the charge/discharge controller, wherein the switching element controls an electrical connection between the battery assembly and the outer terminal.

7. The battery pack of claim 1, wherein the circuit board further comprises a current measuring element electrically connected to the charge/discharge controller.

8. A method of controlling charging and discharging of a battery pack, comprising:
    charging a battery assembly comprising at least one rechargeable lithium battery comprising a negative electrode comprising a silicon-containing negative active material selected from silicon, a silicon-carbon composite, and a combination thereof, and a positive electrode comprising a positive active material; and discharging the battery assembly until a voltage of the battery assembly reaches a predetermined discharge cut-off voltage of a charge/discharge controller, wherein the discharge cut-off voltage is predetermined as a voltage when $Li_xSi$ present in the negative electrode has an x value of less than or equal to about 1.25.

9. The method of claim 8, wherein the x value of $Li_xSi$ is determined by Equation 1:

$$x = A_1 - A_2/e^{kD} \qquad \text{Equation 1}$$

wherein in Equation 1, x is a stoichiometric value of lithium in $Li_xSi$, $A_1$ is a constant ranging from about 1.14 to about 1.35, $A_2$ is a constant ranging from about 11.93 to about 12.13, k is a constant ranging from about 1.88 to about 2.08, and D is an effective average particle diameter of the silicon-containing negative active material during the discharge.

10. The method of claim 9, wherein in Equation 1, $A_1$ is a constant ranging from about 1.19 to about 1.29, $A_2$ is a constant ranging from about 11.98 to about 12.08, and k is a constant ranging from about 1.93 to about 2.03.

11. The method of claim 9, wherein in Equation 1, the effective average particle diameter D ranges from about 1 micrometer to about 5 micrometers.

12. The method of claim 8, wherein the discharge cut-off voltage is determined as a voltage when the discharge capacity determined by Equation 2 is obtained:

$$\frac{x_0 - x}{x_0} \cdot C_{init} \qquad \text{Equation 2}$$

wherein in Equation 2, $x_0$ is a stoichiometric maximum value of lithium present in $Li_xSi$ during the charge;

x is an x value of $Li_xSi$ at the discharge cut-off; and $C_{init}$ is a discharge capacity during a first discharge.

\* \* \* \* \*